No. 625,076. Patented May 16, 1899.
J. & J. F. WILHELM.
FRICTION GEARING.
(Application filed July 13, 1898.)

(No Model.) 2 Sheets—Sheet 1.

Witnesses

Inventors
Jacob Wilhelm
John F. Wilhelm
by R. S. & A. B. Lacey Attorneys

No. 625,076. Patented May 16, 1899.
J. & J. F. WILHELM.
FRICTION GEARING.
(Application filed July 13, 1898.)

(No Model.) 2 Sheets—Sheet 2.

Witnesses
Gladys L. Thompson.

Inventors
Jacob Wilhelm
John F. Wilhelm by R. S. & A. B. Lacey Attorneys

THE NORRIS PETERS CO., PHOTO-LITHO., WASHINGTON, D. C.

UNITED STATES PATENT OFFICE.

JACOB WILHELM, OF NEW FREEDOM, PENNSYLVANIA, AND JOHN F. WILHELM, OF BALTIMORE, MARYLAND, ASSIGNORS OF ONE-THIRD TO A. N. FALKENSTEIN, OF GLEN ROCK, PENNSYLVANIA.

FRICTION-GEARING.

SPECIFICATION forming part of Letters Patent No. 625,076, dated May 16, 1899.

Application filed July 13, 1898. Serial No. 685,866. (No model.)

*To all whom it may concern:*

Be it known that we, JACOB WILHELM, residing at New Freedom, in the county of York and State of Pennsylvania, and JOHN F. WILHELM, residing at Baltimore, in the State of Maryland, citizens of the United States, have invented certain new and useful Improvements in Friction-Gearing; and we do hereby declare the following to be a full, clear, and exact description of the invention, such as will enable others skilled in the art to which it appertains to make and use the same.

This invention relates to friction-gearing; and it consists, essentially, of two supports adjustably arranged in planes at right angles to each other and having thereon short shafts which are longitudinally disposed relatively to the said supports, one of which has a friction-disk on the end thereof with a conical contact-face and the other a smaller disk also provided with a conical face, both of the supports, and consequently the shafts and disks, being adjustable and one of the shafts driven by a belt from an adjacent line or other shaft and transmitting motion through the said disks to the second shaft, from which the power is in turn utilized to operate different kinds of machinery and to which the gearing may be applicable.

The invention further consists of the details of construction and arrangement of the several parts, which will be more fully hereinafter described and claimed.

The object of the invention is to arrange frictional gearing in such manner that a variation in speed may be easily acquired by relatively shifting two adjacently-situated friction-disks, one of which is smaller than the other, to institute a differentiation in rotation under normal conditions and also to compensate for the change of position of the driving and driven belts or other transmitting devices without requiring the use of belt-shifters or analogous devices and, further, without impairing the positive operation of the gearing.

Figure 1:
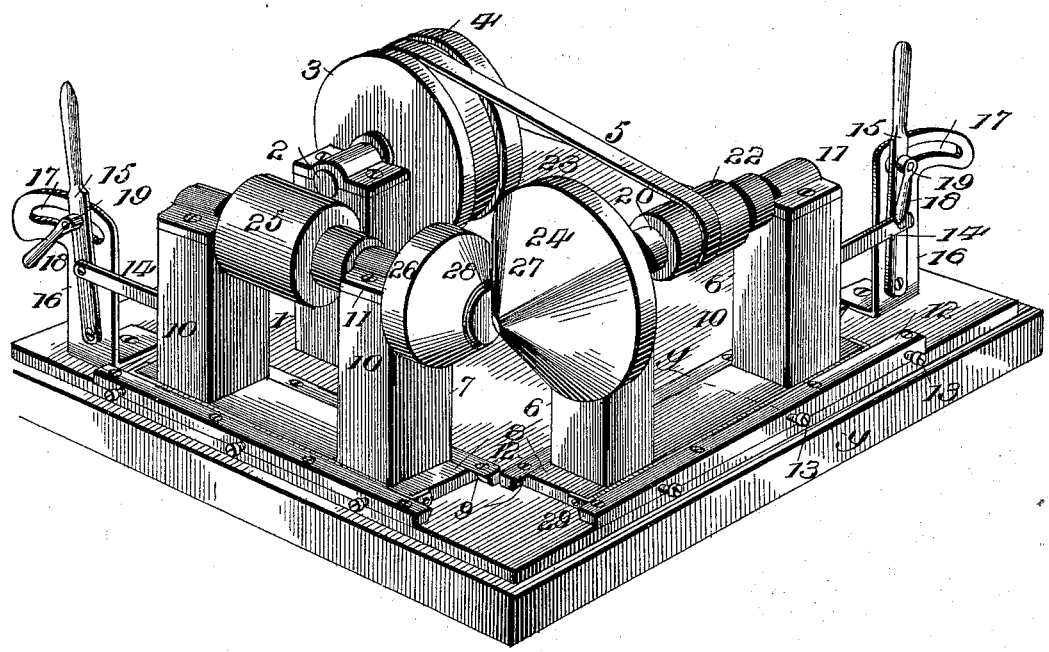
Figure 3:
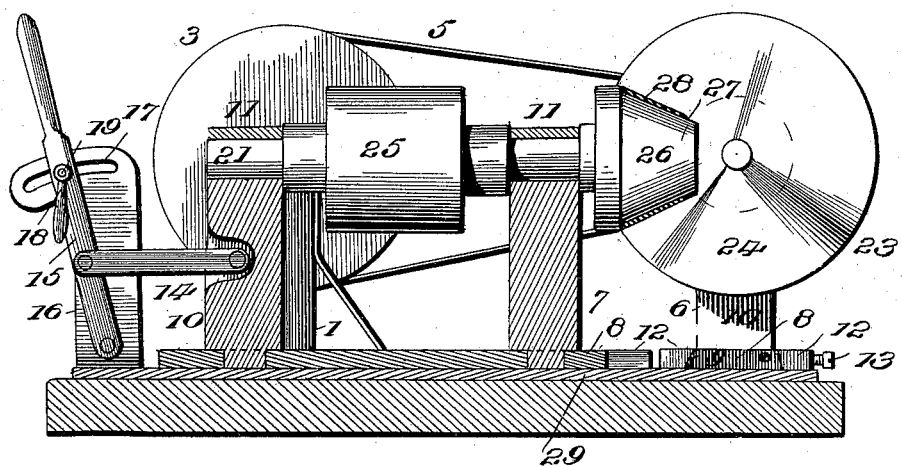
Figure 2:
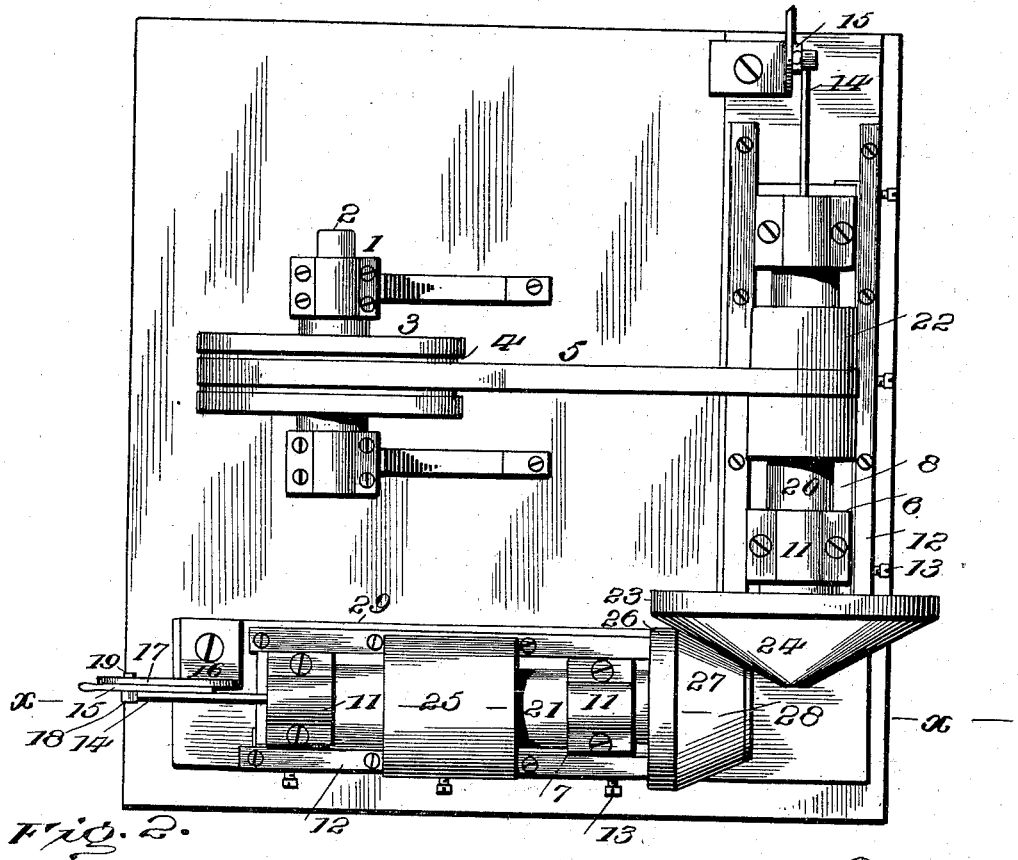
Figures 4, 5:
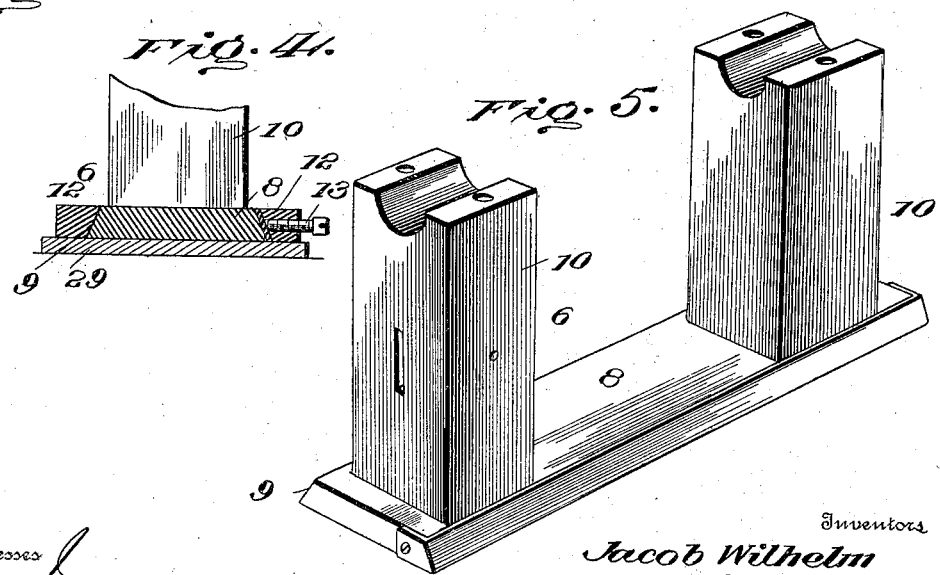

In the accompanying drawings, Figure 1 is a perspective view of frictional gearing embodying the invention. Fig. 2 is a top plan view of the same. Fig. 3 is a section on the line *x x*, Fig. 2. Fig. 4 is a section on the line *y y*, Fig. 1. Fig. 5 is a detail perspective view of one of the supports.

Referring to the drawings, wherein similar numerals are employed to indicate corresponding parts in the several views, the numeral 1 designates journal-standards having suitable boxes on the upper ends, in which a line or other driving shaft 2 is rotatably mounted and has keyed thereon between the said standards a band-wheel or pulley 3 of suitable dimension and preferably constructed with a circumferential band or belt groove 4, which is of greater width than the band or belt 5, surrounding the same and operated thereby. Nearer the standards 1 two supports 6 and 7 are adjustably mounted and arranged at right angles to each other. Each support comprises a flat base-plate 8 with opposite outwardly-beveled edges 9 and from which rise bearing-standards 10, having journal-boxes 11 on the upper ends thereof. Each of the base-plates is mounted between opposite guides 12, which have their inner edges beveled in planes reverse to the opposite edges 9 of said plates, and by this means the supports are longitudinally adjustable, and to take up wear and insure a constant and stable position of the several supports adjusting-screws 13 are mounted in one of the guides and adapted to bear against the adjacent edges of the plates. These screws are situated apart from each other and distanced proportionate to the length of the plates to obviate the formation of a resisting obstruction that might under certain circumstances ensue. To adjust these supports, a link 14 is movably attached to the outermost standards 6 and 7, and at its opposite end said link is also movably secured to a shifting-lever 15, pivotally attached to an upright 16, having a segmentally-slotted head 17, which is engaged by a clampingscrew or analogous device 18, with a clamping-arm 19 thereon to hold the lever 15 firmly in its adjusted position. The upper end of each lever 15 is formed into a handle of a convenient length.

On the pairs of standards 6 and 7 included in each support short shafts 20 and 21 are mounted in the journal-boxes 11. The shaft 20 stands in a plane parallel with the line or drive shaft 2 and has thereon, between the standards 6, an elongated pulley 22, around which the band or belt 5 from the pulley 3 is passed. On the outer end of the shaft 20, or that farthest from the standard to which the link 14 is attached, a friction-disk 23 is keyed fast and has a front conical contact-face 24. On the shaft 21, which is at a right angle to the shaft 20, as previously set forth, an elongated pulley 25 is secured between the standards 7, and on the outer end of this shaft also a friction-disk 26 is firmly secured and formed with an outer frusto-conical contact-face 27, which is surrounded in part by an antislipping strip 28 of suitable material. The friction-disk 26 is of considerable less dimension than the disk 23, and the pulley 25 is preferably of greater diameter than the pulley 22 on the shaft 20.

The supports, as shown, have their base-plates on wear-plates 29 secured to the flooring. The said base-plates and supports in the main might be constructed of wood, while the guides 12 are of metal, and to obviate as much as possible the wear that would naturally take place metallic wear-strips 30 are attached to the opposite beveled edges 9 of the said base-plates.

To cause the shaft 21 to rotate at the highest speed possible by the construction and arrangement shown, the smaller disk 26 is caused to have its frusto-conical face 27 engage the conical face 24 of the larger disk 23, adjacent the periphery of the latter, and to about equalize the running speed of both disks 20 and 21 the disks are arranged so that the smaller one will engage the central part of the conical face 24 of the disk 23, and by changing the position of the disks from either extreme or so that a contact will be established with the larger disk at points intermediate of its greatest and less speeding power, respectively at the periphery and center, as stated, the smaller disk is brought to bear on intermediate points, and thereby vary its speed, which may be found necessary for operating different kinds of machinery and when carrying on work which calls for a graduated change of speed. In arranging the disks for contact and to obtain the variations specified both have to be adjusted to a greater or less extent, as the several parts are so positioned that the adjustment of one disk will not accurately cause the desired regulation of the other disk. The degree of adjustment necessary to obtain certain speeds will be ascertained from practice and be proportionate to the dimensions of the disks, which might be changed. A further advantage of the adjustable features of both disks is that either one may be thrown out of contact when it is desired to stop the machinery and again adjusted so as to be brought into contact and maintain the speed which may be required by the work then being carried on. It is often found necessary in the arts and manufactures where machinery is employed that a similar kind of work at different stages of completion requires a variation in the operation of the parts, and by this means also the auxiliary attachments—such as drivers, punchers, cutters, and analogous devices—are less liable to be impaired when meeting with greater resistance or obstruction at certain times and the completed work is more satisfactory than it would be in the absence of adjustable mechanism for regulating the speed.

By the use of a larger pulley 25 on the shaft 21 than on the shaft 20 the speed is again increased if the band or belt running from said pulley 25 engages the opposite band wheel or pulley of smaller dimension. This variation in the proportions of the several parts, as well as the dimensions generally, will be regulated in accord with the work to be done, and it is also obviously apparent that changes in the details of construction might be resorted to without departing from the nature or spirit of the invention or sacrificing any of the advantages thereof.

Having thus described the invention, what is claimed as new is—

1. In a friction-gearing, the combination of two adjustable standards arranged at a right angle to each other, individual shafts rotatably held by said supports at the same angle as the latter and each having a friction-disk on one end, the one friction-disk being smaller than the other and both having conical contact-faces, an elongated pulley on one shaft, a pulley on the other shaft, a line or analogous shaft having a band-wheel thereon, a belt running from said band-wheel to the elongated pulley, and means for adjusting the standards independently of each other.

2. In a friction-gearing, the combination of two standards arranged at a right angle to each other and having independent adjustable movement, independent means for adjusting said standards, shafts mounted on said standards and in the same plane as the latter, friction-disks having conical faces on one end of each of the shafts, one friction-disk being larger than the other, a line or analogous shaft having a band-pulley thereon, and a belt running from said latter pulley to one of the shafts on one of the standards.

3. In a friction-gearing, the combination of two adjustable supports arranged at a right angle to each other and each comprising a base-plate with opposite beveled edges and standards rising from said base-plates, guide-strips on opposite sides of the base-plates, means for adjusting said supports, shafts on the supports having pulleys thereon, friction-disks on the adjacent ends of the shafts, one of which is larger than the other and both having conical contact-faces, and means for rotating the shaft carrying the larger disk.

In testimony whereof we affix our signatures in presence of two witnesses.

JACOB WILHELM.
JOHN F. WILHELM.

Witnesses:
J. B. SWEITZER,
URIAH S. DISE.